United States Patent
Lieber et al.

(10) Patent No.: US 10,592,453 B2
(45) Date of Patent: Mar. 17, 2020

(54) MOVING FROM BACK-TO-BACK TOPOLOGY TO SWITCHED TOPOLOGY IN AN INFINIBAND NETWORK

(71) Applicant: EMC IP Holding Company LLC, Hopkinton, MA (US)

(72) Inventors: Ahia Lieber, Hertzeliya (IL); Liran Loya, Hod Hasharon (IL); Alex Kulakovsky, Hertzeliya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/051,907

(22) Filed: Aug. 1, 2018

(65) Prior Publication Data
US 2020/0042481 A1 Feb. 6, 2020

(51) Int. Cl.
*G06F 13/40* (2006.01)
*G06F 13/16* (2006.01)
*G06F 3/06* (2006.01)

(52) U.S. Cl.
CPC .......... *G06F 13/4022* (2013.01); *G06F 3/065* (2013.01); *G06F 3/067* (2013.01); *G06F 3/0619* (2013.01); *G06F 3/0635* (2013.01); *G06F 13/1668* (2013.01)

(58) Field of Classification Search
CPC ............. G06F 13/4022; G06F 13/1668; G06F 3/0619; G06F 3/0635; G06F 3/065; G06F 3/067
See application file for complete search history.

(56) References Cited

U.S. PATENT DOCUMENTS

| 7,769,913 | B1 * | 8/2010 | Budhia | G06F 11/2092 370/475 |
| 2003/0120852 | A1 * | 6/2003 | McConnell | G06F 13/385 710/316 |
| 2003/0208572 | A1 * | 11/2003 | Shah | H04L 41/12 709/223 |
| 2006/0059269 | A1 * | 3/2006 | Chen | H04L 49/254 709/235 |

(Continued)

OTHER PUBLICATIONS

Mellanox Technologies, InfiniBand for Storage Applications White Paper, Dec. 2007 (Year: 2007).*

*Primary Examiner* — Tim T Vo
*Assistant Examiner* — Phong H Dang
(74) *Attorney, Agent, or Firm* — Daly, Crowley Mofford & Durkee, LLP (57) ABSTRACT

Moving from a back-to-back topology to a switched topology in an InfiniBand network includes, prior to connecting a switch for a first storage controller in the network and during reboot of the first storage controller, waiting for a second storage controller in the network to become master, and upon the second storage controller becoming master, changing cache files for local ports on the first storage controller regarding adjacent ports' LID assignments. An aspect further includes restarting a system manager for the first storage controller, connecting the first storage controller to the system with new LID assignments provided by changed files on first storage controller, and upon the first storage controller becoming active, rebooting the second storage controller, changing the LID assignments in the active storage controller, and adding new switches to the system.

18 Claims, 7 Drawing Sheets

(56) References Cited

U.S. PATENT DOCUMENTS

2013/0054947 A1* 2/2013 Gavrilov ............... G06F 9/4401
713/2
2016/0301565 A1* 10/2016 Zahid .................. H04L 41/0672
2018/0234330 A1* 8/2018 Johnsen ................. H04L 43/50

* cited by examiner

MOVING FROM BACK-TO-BACK TOPOLOGY TO SWITCHED TOPOLOGY IN AN INFINIBAND NETWORK

BACKGROUND

Modern storage systems, such as XtremIO, leverage InfiniBand networks to connect storage controllers to each, leveraging remote direct memory access (RDMA) high speed connection. InfiniBand is a specification for a type of communications link for data flow between processors and input/output (TO) devices. XtremIO data path processes are connected via RDMA and pass requests and metadata between the different processes.

A brick configuration in XtremIO system is two storage controllers connected to a shared solid state drive (SSD) drawer. In the basic configuration of a single brick, the storage controllers are connected to each other back-to-back via InfiniBand cables. Each storage controller has two ports and each cable connects each port to its adjacent port.

When expanding to a multi-brick system, two InfiniBand switches are needed in order to interconnect several storage controllers. Each port is then connected to a different switch, and the switches themselves are connected via two ports.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for converting an InfiniBand network from a back-to-back topology to a switched topology. The method includes prior to connecting a switch for a first storage controller in the network and during reboot of the first storage controller, waiting for a second storage controller in the network to become master, and upon the second storage controller becoming master, changing cache files for local ports on the first storage controller regarding adjacent ports' LID assignments. The method also includes restarting a system manager for the first storage controller, connecting the first storage controller to the system with new LID assignments provided by changed files on first storage controller, and upon the first storage controller becoming active, rebooting the second storage controller, changing the LID assignments in the active storage controller, and adding new switches to the system.

Another aspect may provide a system for converting an InfiniBand network from a back-to-back topology to a switched topology. The system includes a memory having computer-executable instructions and a processor. The processor executes the computer-executable instructions. When executed by the processor, the computer-executable instructions cause the processor to perform operations. The operations include prior to connecting a switch for a first storage controller in the network and during reboot of the first storage controller, waiting for a second storage controller in the network to become master, and upon the second storage controller becoming master, changing cache files for local ports on the first storage controller regarding adjacent ports' LID assignments. The operations also include restarting a system manager for the first storage controller, connecting the first storage controller to the system with new LID assignments provided by changed files on first storage controller, and upon the first storage controller becoming active, rebooting the second storage controller, changing the LID assignments in the active storage controller, and adding new switches to the system.

Another aspect may provide a computer program product embodied on a non-transitory computer readable medium. The computer program product includes instructions that, when executed by a computer, causes the computer to perform operations. The operations include prior to connecting a switch for a first storage controller in the network and during reboot of the first storage controller, waiting for a second storage controller in the network to become master, and upon the second storage controller becoming master, changing cache files for local ports on the first storage controller regarding adjacent ports' LID assignments. The operations also include restarting a system manager for the first storage controller, connecting the first storage controller to the system with new LID assignments provided by changed files on first storage controller, and upon the first storage controller becoming active, rebooting the second storage controller, changing the LID assignments in the active storage controller, and adding new switches to the system.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium.

In certain embodiments, the term "I/O request" or simply "I/O" may be used to refer to an input or output request, such as a data read or data write request.

In certain embodiments, a storage device may refer to any non-volatile memory (NVM) device, including hard disk drives (HDDs), solid state drives (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton, Mass.). In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, a snapshot may refer to differential representations of an image, i.e. the snapshot may have pointers to the original volume, and may point to log volumes for changed locations. In certain embodiments, a snapshot may refer to differential representations of the state of a system. Snapshots may be combined into a snapshot array, which may represent different images over a time period or different states of a system over a time period.

In certain embodiments, a journal may be a record of write transactions (e.g., I/O data) issued to a storage system, which may be used to maintain a duplicate storage system, and to roll back the duplicate storage system to a previous point in time. In some embodiments, each entry in a journal contains, apart from the I/O data itself, I/O metadata that can include information such as a volume identifier (ID), the I/O block offset within the volume, the I/O length, and a time stamp of the I/O.

In certain embodiments, XtremIO, available from Dell/EMC of Hopkinton, Mass., is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout metadata, and actual user data. In certain embodiments, a checkpoint preserves the state of a system at a given point in time by saving one or more snapshots of, for example, a file system, or an application at one or more points in time. A checkpoint can preserve a snapshot of an application's state, so that it can restart from that point in case of failure, which can be useful for long running applications that are executed in failure-prone computing systems. If a checkpoint is used, an application periodically writes large volumes of snapshot data to persistent storage in an attempt to capture its current state. Thus, if there is a failure, the application can recover by rolling-back its execution state to a previously saved checkpoint.

In certain embodiments, a "checkpoint" refers at least to an entity created by a checkpoint process, where the checkpoint process performs actions to preserve the state of an apparatus, system, or other entity (including software entities) at a particular time. Advantageously, a checkpoint includes information such as user data, the configuration of the apparatus, user metadata, and other information related to the internal state of the apparatus or system. For example, some storage systems (including XtremIO), in accordance with certain embodiments herein, also provide some kind of checkpoint feature, to provide an ability to preserve system state including user data and metadata at some defined point in time in order to restore this state after system malfunction or corruption. In certain embodiments, the checkpoint corresponds to a frozen, immutable re representation of the state of a system or apparatus at certain point in time, including user data, metadata, and the system configuration. In certain embodiments, the checkpoint is stored in a dedicated, reserved location within the system. In certain embodiments, the checkpoint is able to be created in an online, dynamic environment, where the checkpoint creation is transparent to entities having I/O interactions with the system.

For a file system, the accuracy and consistency of a file system is necessary to relate applications and data, so a checkpoint provides a way to provide periodic backup of file server state to allow system recovery in the event of faults or failures. When data corruption is detected, one of the checkpoints can be used for file system recovery. Similarly, a checkpoint, in a virtualization context, is a snapshot of the state of a virtual machine. Like a restore point in MICROSOFT WINDOWS operating systems, a checkpoint allows an administrator to restore an entity (e.g., a computer system, a file system, an application, a virtual machine, etc.) to a previous state. Checkpoints also can be used to create backups before conducting updates. Should an update fail or cause problems, an administrator can return the virtual machine to its state prior to the update. A recover action is used to return the system to the checkpoint state.

In some embodiments, logical block addressing" (LBA) refers to a linear addressing technique for specifying locations of blocks of data stored in storage system.

In some embodiments, non-volatile memory over fabrics (NVMEoF) refers to a specification to enable non-volatile memory message-based commands to transfer data between hosts and targets (solid-state storage) or other systems and networks, such as Ethernet, Fibre Channel (FC) or InfiniBand.

In certain embodiments, XtremIO, available from Dell/EMC of Hopkinton, Mass., is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

Figure 1:
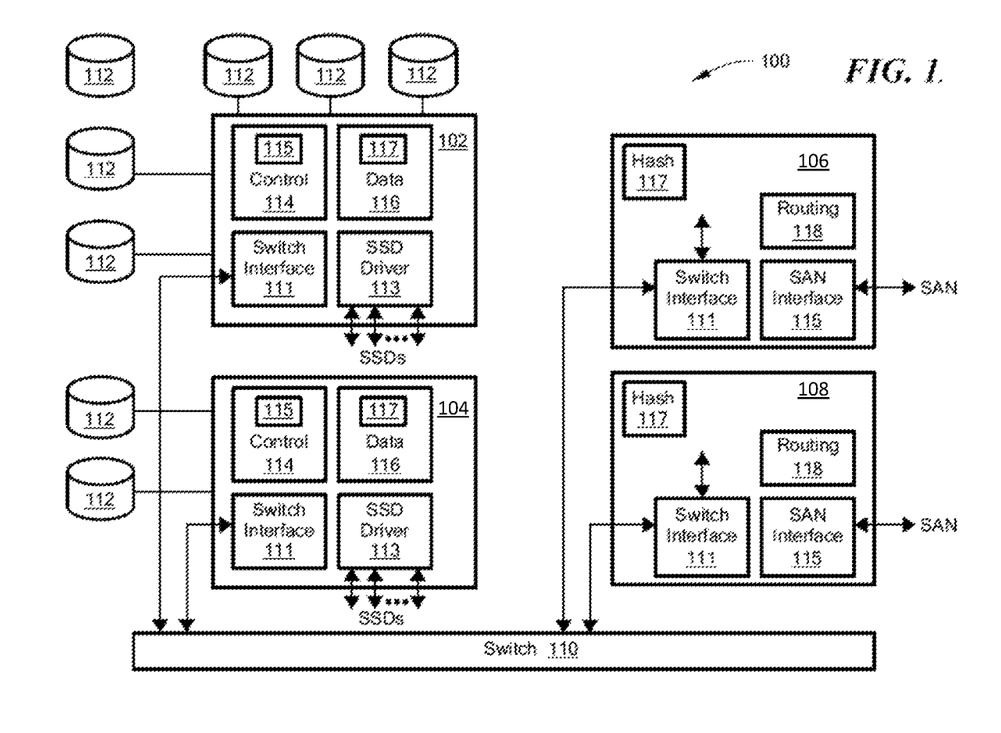
FIG. 1 is a block diagram of a content-based storage system.

FIG. 1 shows an illustrative content-based data storage system 100 with deduplication that may have multi-level data caches in accordance with embodiments of the disclosure. In the illustrated embodiment, first, second, third, and fourth nodes 102, 104, 106, 108 can be interconnected by a switch 110 via a switch interface 111. The first node 102 can include a control system 114 and a data system 116. In embodiments, separate data and control planes may be provided by the control and data systems 114, 116. The control system 114 may control execution of read and write commands to the storage devices 112. The data systems 116 may be connected to the storage devices 112 and, under control of a respective control system 114, may pass data to and/or from the storage devices via suitable storage drivers 113.

The data and/or control systems 114, 116 may retain extracts of the data stored in the storage devices 112. In embodiments, the data extracts may be generated by cryptographic hashing of the data content in the data blocks. In embodiments, the extracts may be used for content addressing of the data blocks to the physical storage devices 112.

The second node 104 can include a hash system 117 to generate the hash/extract, which can be referred to as a content fingerprint for the data blocks. The second node 104 can also include a routing system 118, along with a switch interface 111 and a SAN interface 115. The routing system 118 may terminate storage and retrieval operations and distribute commands to control systems 114 that may be selected for the operation in such a way as to retain balanced usage within the system. In the illustrated embodiment, the third node 106 can be similar to the first node 102 and the fourth node 108 can be similar to the second node 108.

The routing systems 118 may use the hash values calculated from data blocks to select control systems 114 for distribution. More particularly, selection of the control system 114 may use hash values, or may rely on the user address and not on the content (hash). The hash value may, however, be used for selecting the data system 116, and for setting the physical location for data storage within the data system.

In example embodiments, control modules 114 (also referred to as "C-Modules") can include a C cache 115 and the data modules 116 (also referred to as "D-Modules") can include a D cache 117. As explained more fully below, the C cache 115 can include addresses and address hashes, and the D cache 117 can include, for each bucket, physical data location information, a filter, a hash to physical location, and bucket information. The control modules may be referred to as a logical layer, holds the metadata for the logical layer, and implements the volume/snapshot operations. The data module manages the SSDs and implements one or more RAID algorithms as described further herein.

In some examples, the system 100 may employ more than a single type of memory technology, including a mix of more than one Flash technology (e.g., single level cell (SLC) flash and multilevel cell (MLC) flash), and a mix of Flash and DRAM technologies. In certain embodiments, data mapping may optimize performance and life span by taking advantage of the different access speeds and different write/erase cycle limitations of the various memory technologies.

As indicated above, modern storage systems like XtremIO leverage an InfiniBand network to connect storage controllers to each other, leveraging RDMA high speed connections. XtremIO data-path processes are connected via RDMA and pass requests and metadata between the different processes.

A brick configuration in XtremIO system includes two storage controllers connected to a shared SSDs drawer. In the basic configuration of a single brick, the storage controllers are interconnected back-to-back via InfiniBand cables. Each storage controller has two ports and each cable connects each port to its adjacent port. When expanding to a multi-brick system, two InfiniBand switches are needed in order to connect several storage controllers one to the other. Each port then, is connected to a different switch. The switches themselves are interconnected via two ports. An XtremIO InfiniBand fabric (in a single brick and in a multi-brick configuration) is managed by OpenSM, a subnet manager.

The embodiments described herein enable the conversion of an InfiniBand network from a back-to-back topology to a switched topology. The embodiments described herein provide the steps needed in order to expand the fabric from a single brick without a switch to a multi-brick system with two InfiniBand switches.

In XtremIO, a single brick product is a brick composed of two storage controllers connected back-to-back (port 1<->port 1, port 2<->port 2) without an InfiniBand switch. XtremIO data-path processes are spread across the storage controllers two on each node. These processes connect to each other via RDMA managed by OpenSM.

The InfiniBand subnet manager (OpenSM) assigns Local Identifiers (LIDs) to each port connected to the InfiniBand fabric, and develops a routing table based on the assigned LIDs. There are two OpenSM masters running on the brick since there are two networks. Each OpenSM master can assign free LIDs to the relevant ports. A duplicate LID assignment is legal and might happen in this network structure as both networks are separate.

In a united fabric (once InfiniBand switches are connected) a duplicate LID assignment will cause routing issues and a LID change event in the fabric. LID changes results in disconnection of modules from each other, which further results in an un-managed hiccup time. The OpenSM master is responsible for assigning LIDs to newly discovered storage controllers in the fabric. LID assignment in XtremIO needs to be persistent and consistent and is determined by OpenSM cache files.

OpenSM cache files are saved on the storage controller for each port's globally unique identifier (guid) and map between port guid and LID assignment.

| Port guid | Start LID | End LID |
| --- | --- | --- |
| 0x001e670300fd32d7 | 0x0001 | 0x0001 |
| 0x001e670300fd32d8 | 0x0002 | 0x0002 |
| 0x001e670300f1cefd | 0x0003 | 0x0003 |
| 0x001e670300f1cefe | 0x0004 | 0x0004 |

The files are kept per port guid and reflect the port's view of the InfiniBand network LIDs' assignment. OpenSM master based on the cache files assigns LIDs per port in the network. In case the file changes OpenSM master honors the change and performs the LID change. A lid change causes a disconnection of the relevant connection.

Figure 2:
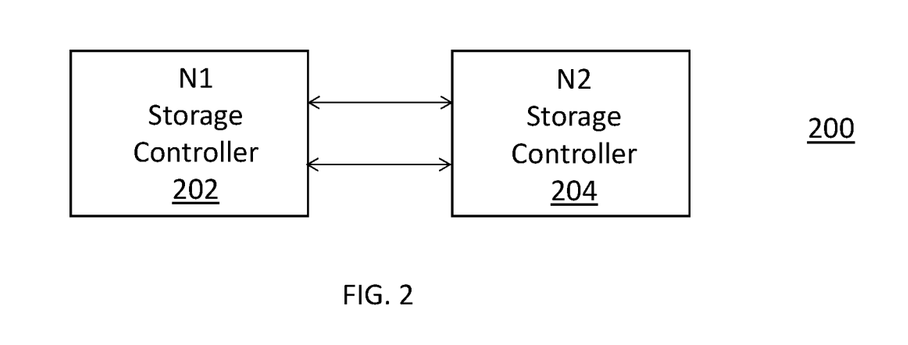
FIG. 2 is a block diagram of a single brick network.
Figure 3:
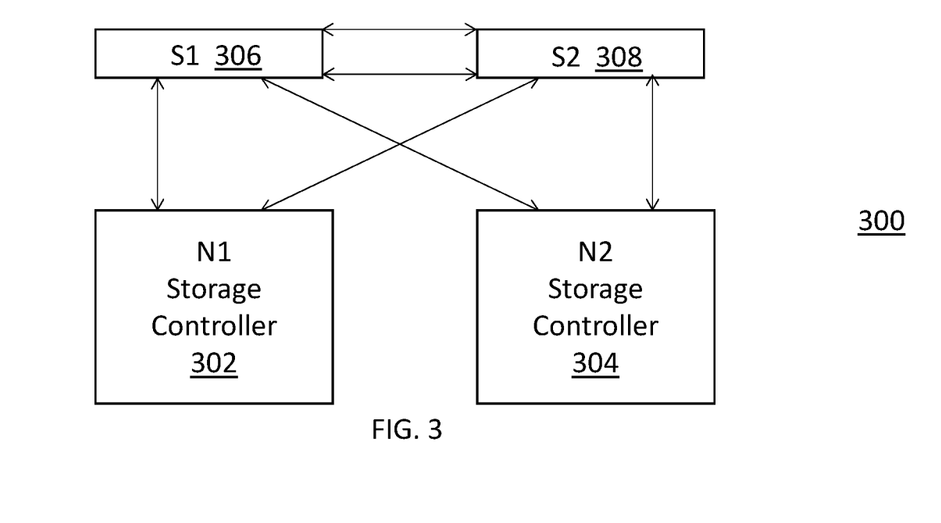
FIG. 3 is a block diagram of a multi-brick network.

In a single brick system, each storage controller has two physical connections between processes, as illustrated in FIG. 2. As shown in the brick system of FIG. 2, two storage controllers 202 and 204 are connected by two physical connections. In a multi-brick system 300, as shown in FIG. 3, each storage controller 302 and 304 has four physical connections between processes. In the multi-brick system 300, there are shown two switches 306 and 308 connected to one another and also interconnecting storage controllers 302 and 304.

Figure 4:
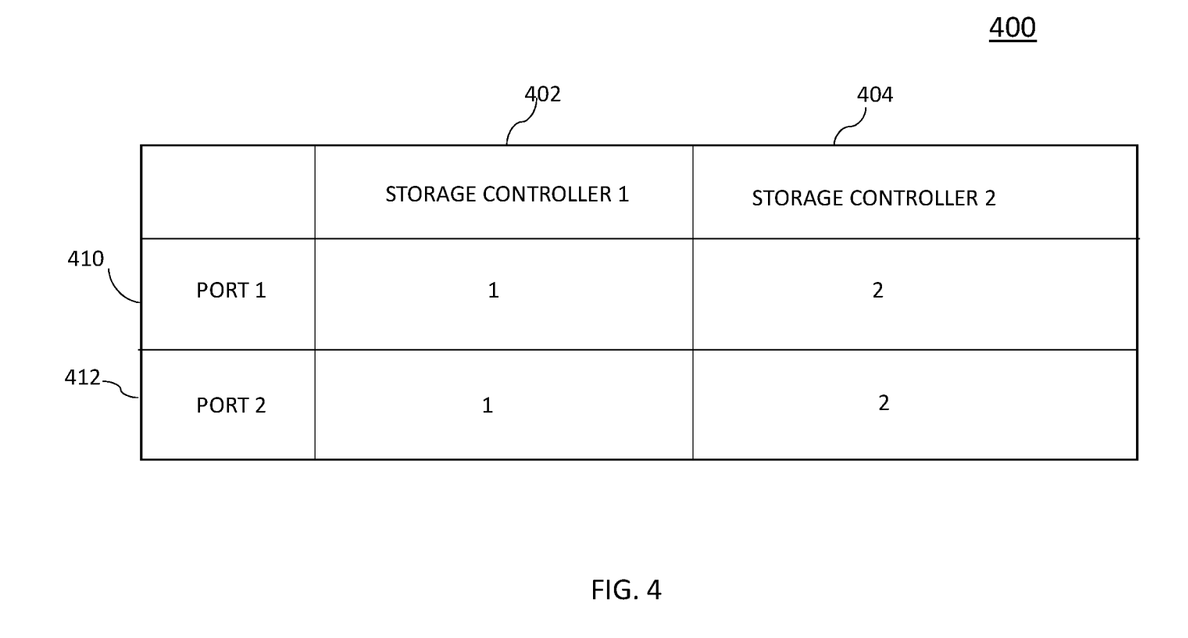
FIG. 4 is a table depicting duplicated LID assignments.

In a single brick system there exist two InfiniBand networks and two OpenSM masters are running. LID assignment is determined by syncing OpenSM cache files between the two storage controllers. As mentioned LIDs can be duplicated as described herein. In the table 400 shown in FIG. 4, OpenSM master assigned, for storage controllers 402 and 404, a first network 410 (port 1) LIDs 1 and 2 and a network 412 (port 2) LIDs 1 and 2 as well. The configuration is legal since this is back-to-back connectivity. Adding an InfiniBand switch and uniting the separated networks to a single fabric may result in a LID change event if the LIDs assignment is not unique between the storage controllers. The addition of the InfiniBand switches must be done online without service lost. The steps to add the switches to the system must be in non-disruptive way.

The embodiments described herein provide a way to change requested LIDs assignment per storage controller when the requested storage controller is in the process of reboot and when InfiniBand ports are down. The embodiments described herein provide for changing the requested LIDs in a multi-phase way.

In a single brick before connecting a switch, a first phase includes rebooting the storage controller (e.g., storage controller A), waiting for the other active storage controller to become OpenSM master (if it is not already master for both ports), changing the OpenSM cache files for local ports regarding adjacent ports LID assignments, and restarting the OpenSM to honor the edited files. A master decides which LIDs should be in the network. Honoring the files indicates that if the files are changed to reflect new LID assignments then OpenSM will take the information from the file and use it instead of trying to figure it out independently. In a second phase, the rebooted storage controller is connected back to the system with new LID assignment given by the changed files on the active storage controller, and once the storage controller becomes active, rebooting the other storage controller, and changing the LID assignment for it in the active storage controller. After both phases are complete, all of the LIDs are changed as requested.

After verifying that the LID assignment is correct in the fabric, two new switches can be added to the system without worry about LID change events.

Figure 5:
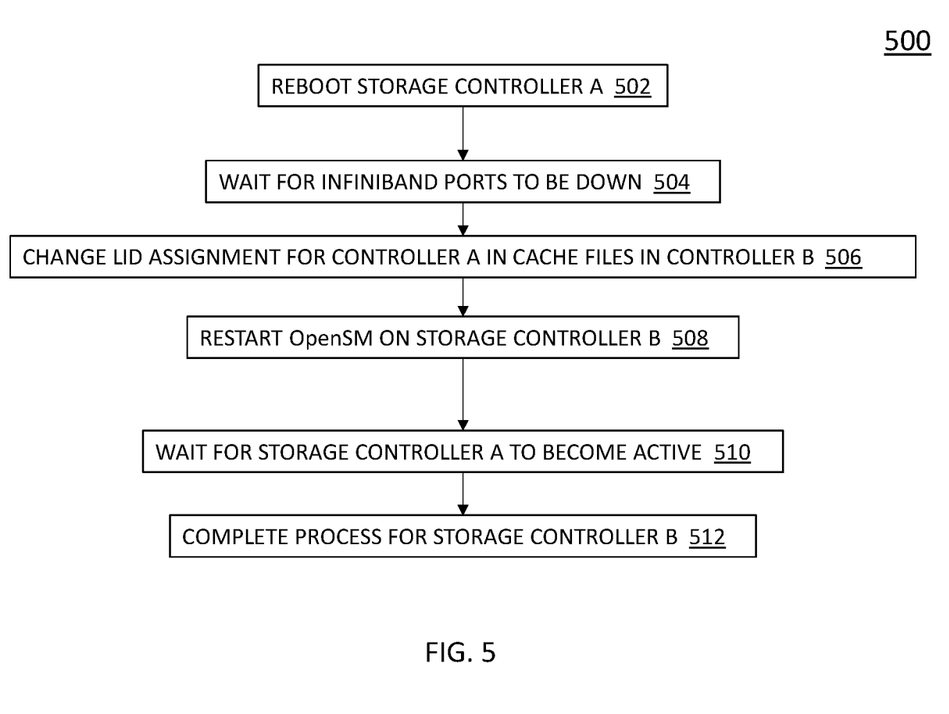
FIG. 5 is flow diagram of a process for converting an Infiniband network from a back-to-back topology to a switched topology.

Turning now to FIG. 5, a flow diagram of a process 500 for implementing the embodiments will now be described. The process may be implemented in a storage controller or elsewhere in the system. In block 502, the storage controller (e.g., storage controller A) is rebooted. In block 504, the process waits for InfiniBand ports to be down. In block 506, the LID assignments are changed for controller A in cache files of controller B. In block 508, OpenSM is restarted on storage controller B. In block 510, the process waits for storage controller A to become active. In block 512, the process is completed for storage controller B.

Figure 6:
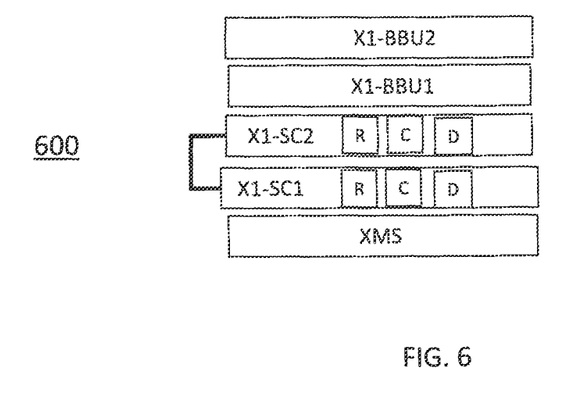
FIG. 6 depicts a single brick configuration before adding switches.

FIG. 6 illustrates a single brick configuration before adding switches. In the figure, storage controller X1-SC1 and storage controller X1-SC2 are connected back to back.

Figure 7:
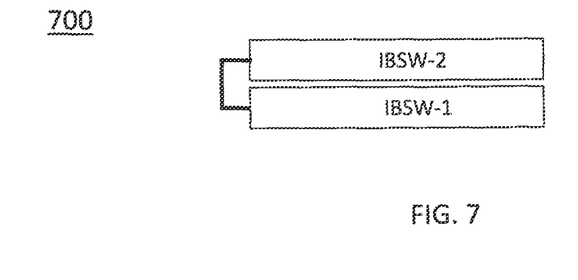
FIG. 7 depicts two interconnected switches.

FIG. 7 illustrates InfiniBand switches that are interconnected.

Figure 8:
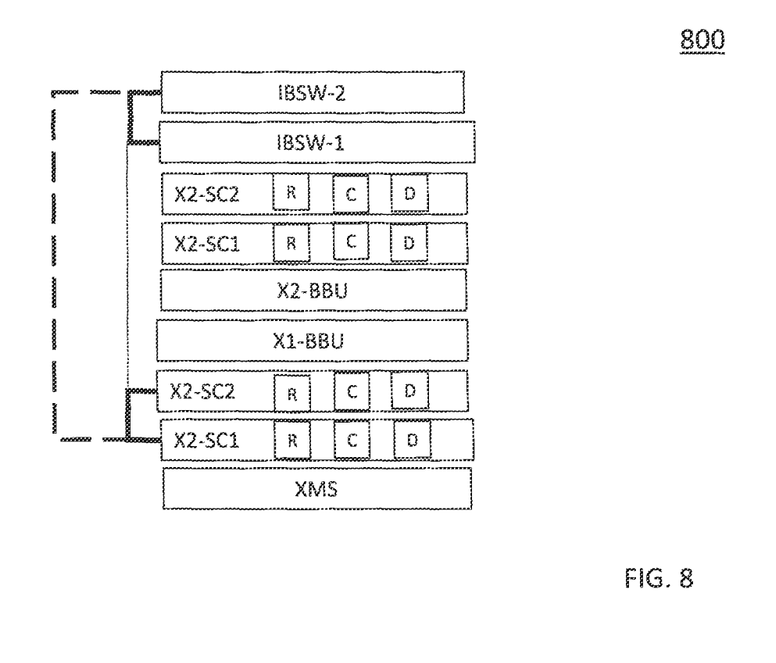
FIG. 8 depicts a switched network.

In FIG. 8, port 1 of storage controller X1-SC1 is disconnected and then connected to InfiniBand switch (IBSW-1). Storage controller X1-SC1 and storage controller X1-SC2 are still connected via port 2. Port 1 of X1-SC2 is disconnected and then connected to IBSW-2. Connections between X1-SC1 and X1-SC2 are re-established via port 1 since InfiniBand switches are connected to each other. Port 2 of X1-SC1 is disconnected and then connected to IBSW-1. Port 2 of X1-SC2 is disconnected and then connected to IBSW-2. After completing this step, connections between each process are formed, and the network is switched.

Figure 9:
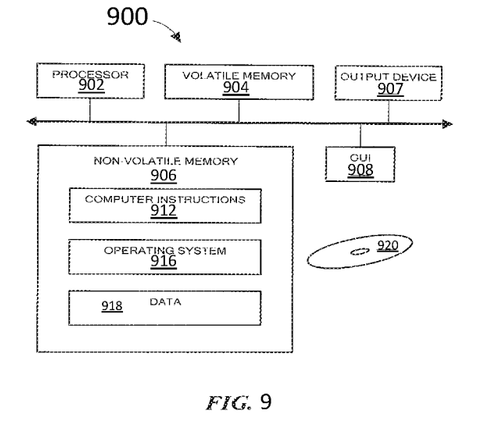
FIG. 9 is a block diagram of an illustrative computer that can perform at least a portion of the processing described herein.

FIG. 9 shows an exemplary computer 900 (e.g., physical or virtual) that can perform at least part of the processing described herein. The computer 900 includes a processor 902, a volatile memory 904, a non-volatile memory 906 (e.g., hard disk or flash), an output device 907 and a graphical user interface (GUI) 908 (e.g., a mouse, a keyboard, a display, for example). The non-volatile memory 906 stores computer instructions 912, an operating system 916 and data 918. In one example, the computer instructions 912 are executed by the processor 902 out of volatile memory 904. In one embodiment, an article 920 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
    prior to connecting a switch for a first storage controller in a network and during reboot of the first storage controller;
    waiting for a second storage controller in the network to become master, the second storage controller s active;
    upon the second storage controller becoming master, changing cache files for local ports on the first storage controller regarding local identifier (LID) assignments;
    restarting a system manager for the second storage controller;
    connecting the first storage controller to the network with the LID assignments provided by the changed cache files for the first storage controller;
    upon the first storage controller becoming active, rebooting the second storage controller;
    changing LID assignments for local ports on the second storage controller and
    adding the switch to the network.

2. The method of claim 1, wherein the second storage controller becoming master indicates the second storage controller determines the LID assignments that will be in the network.

3. The method of claim 1, wherein the system manager is OpenSM.

4. The method of claim 1, wherein restarting the system manager honors the LID assignments for both the first storage controller and the second storage controller.

5. The method of claim 1, wherein the network is an InfiniBand network.

6. The method of claim 1, wherein LID assignments for the first storage controller and the second storage controller are persistent and are determined by the cache files: wherein the first storage controller and the second storage controller share the same LID assignments.

7. A system, comprising
    a memory comprising computer-executable instructions; and
    a first storage controller;
    a second storage controller;
    a processor executing the computer-executable instructions, the computer-executable instructions when executed by the processor cause the processor to perform operations comprising:
    prior to connecting a switch for the storage controller in a network and during reboot of the first storage controller;
    waiting for the second storage controller in the network to become master, the second storage controller is active;
    upon the second storage controller becoming master, changing cache files for local ports on the first storage controller regarding local identifier (LID) assignments;
    restarting a system manager for the second storage controller;
    connecting the first storage controller to the network with the LID assignments provided by the changed cache files for the first storage controller;
    upon the first storage controller becoming active, rebooting the second storage controller;
    changing LID assignments for local ports on in the second storage controller; and
    adding the switch to the network.

8. The system of claim 7, wherein the second storage controller becoming master indicates the second storage controller determines the LID assignments that will be in the network.

9. The system of claim 7, wherein the system manager is OpenSM.

10. The system of claim 7, wherein restarting the system manager honors the LID assignments for both the first storage controller and the second storage controller.

11. The system of claim 7, wherein the network is an InfiniBand network.

12. The system of claim 7, wherein LID assignments for the first storage controller and the second storage controller are persistent and are determined by the cache files: wherein the first storage controller and the second storage controller share the same LID assignments.

13. A computer program product embodied on a non-transitory computer readable medium, the computer program product including instructions that, when executed by a computer causes the computer to perform operations comprising
prior to connecting a switch for a first storage controller in a network and during reboot of the first storage controller:
waiting for a second storage controller in the network to become master, the second storage controller is active;
upon the second storage controller becoming master, changing cache files for local ports on the first storage controller regarding local identifier (LID) assignments;
restarting a system manager for the second storage controller;
connecting the first storage controller to the network with the LID assignments provided by changed cache files for the first storage controller;
upon the first storage controller becoming active, rebooting the second storage controller;
changing LID assignments for local ports on the second storage controller, and
adding the switch to the network.

14. The computer program product of claim 13, wherein the second storage controller becoming master indicates the second storage controller determines the LID assignments that will be in the network.

15. The computer program product of claim 13, wherein the system manager is OpenSM.

16. The computer program product of claim 13, wherein restarting the system manager honor the LID assignments for both the first storage controller and the second storage controller.

17. The computer program product of claim 13, wherein the network is an InfiniBand network.

18. The computer program product of claim 13, wherein LID assignments for the first storage controller and the second storage controller are persistent and are determined by the cache files: wherein the first storage controller and the second storage controller share the same LID assignments.

* * * * *